United States Patent
Tang et al.

(10) Patent No.: US 11,988,369 B2
(45) Date of Patent: *May 21, 2024

(54) SUPPORT BASE FOR FURNITURE ACCESSORIES

(71) Applicant: eMoMo Technology Co., Ltd., Shenzhen (CN)

(72) Inventors: Wenji Tang, Shenzhen (CN); Jingzhi Chen, Shenzhen (CN); Dasheng Hu, Dao (CN); Ling Wang, Shenzhen (CN); Qishuang Lu, Dengzhou (CN); Xiaolian Zhou, Shenzhen (CN)

(73) Assignee: eMoMo Technology Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,948

(22) Filed: Jul. 13, 2022

(65) Prior Publication Data

US 2022/0341579 A1 Oct. 27, 2022

Related U.S. Application Data

(63) Continuation of application No. 16/999,319, filed on Aug. 21, 2020, now Pat. No. 11,421,867.

(30) Foreign Application Priority Data

Nov. 7, 2019 (CN) .......................... 201911078975.5

(51) Int. Cl.
*H01R 13/627* (2006.01)
*A47B 19/10* (2006.01)
(Continued)

(52) U.S. Cl.
CPC .............. *F21V 23/06* (2013.01); *A47B 19/10* (2013.01); *H01R 13/6205* (2013.01);
(Continued)

(58) Field of Classification Search
CPC . F21V 23/06; A47B 19/10; A47B 2220/0077; A47B 2220/0091;
(Continued)

(56) References Cited

U.S. PATENT DOCUMENTS

| 4,258,287 A | 3/1981 | Hetzel |
| D473,966 S | 4/2003 | Lecluze |

(Continued)

FOREIGN PATENT DOCUMENTS

CN 206890454 U 1/2018

OTHER PUBLICATIONS

EMoMo E732, No date available, [online], [site visited Sep. 1, 2021]. Available from Internet, URL: http://www.emomotech.com/en/product/51033257.html (Year: NA) (Year NA).

(Continued)

*Primary Examiner* — Thanh Tam T Le
(74) *Attorney, Agent, or Firm* — Womble Bond Dickinson (US) LLP

(57) ABSTRACT

A support base includes a connector hub having a top end, a bottom end spaced apart from the top end, and a chamber wall extending between the top and bottom ends. The chamber wall defines a chamber within the connector hub. An interface may be positioned in the chamber. The interface is dimensioned such that a support gap is formed between the interface and the chamber wall. The support gap may be dimensioned for receiving a wall of a support structure having a hollow interior into which the interface is received.

19 Claims, 9 Drawing Sheets

(51) Int. Cl.
*F21V 23/06* (2006.01)
*H01R 13/62* (2006.01)
*H01R 13/717* (2006.01)
*H01R 13/73* (2006.01)

(52) U.S. Cl.
CPC ....... *H01R 13/6275* (2013.01); *H01R 13/717* (2013.01); *H01R 13/73* (2013.01); *A47B 2220/0077* (2013.01); *A47B 2220/0091* (2013.01)

(58) Field of Classification Search
CPC ............ H01R 13/6205; H01R 13/6275; H01R 13/717; H01R 13/73
See application file for complete search history.

(56) References Cited

U.S. PATENT DOCUMENTS

| | | | |
|---|---|---|---|
| 6,780,049 B1 | 8/2004 | Angelo et al. | |
| 7,393,229 B2 | 7/2008 | Yoshida et al. | |
| 7,578,693 B2 | 8/2009 | Yoshida et al. | |
| D625,031 S | 10/2010 | Yamamoto et al. | |
| 7,850,620 B2 | 12/2010 | Miller et al. | |
| D637,332 S | 5/2011 | Lee | |
| 8,002,587 B2 | 8/2011 | Fleisig | |
| 8,193,658 B2 | 6/2012 | Fleisig | |
| D685,507 S | 7/2013 | Sun | |
| 8,485,701 B2 * | 7/2013 | Chiu | F21V 19/00 362/418 |
| D726,951 S | 4/2015 | Serwacki et al. | |
| 9,352,660 B2 | 5/2016 | Osawa | |
| D761,453 S | 7/2016 | Sorokin | |
| 9,719,641 B1 | 8/2017 | Volek et al. | |
| 9,723,931 B2 | 8/2017 | Lu | |
| D822,856 S | 7/2018 | Liao et al. | |
| 10,122,140 B1 | 11/2018 | Vega-Perez | |
| 10,128,622 B1 | 11/2018 | Clark et al. | |
| 10,128,645 B2 | 11/2018 | Delmas et al. | |
| 10,181,687 B1 * | 1/2019 | Peng | H01R 24/38 |
| 10,276,949 B2 | 4/2019 | Lee et al. | |
| 10,374,353 B2 | 8/2019 | Archuleta et al. | |
| 10,418,768 B1 | 9/2019 | Xiao | |
| 10,422,486 B2 * | 9/2019 | Zhang | F21K 9/237 |
| 10,424,866 B1 | 9/2019 | Peng et al. | |
| 10,431,944 B1 * | 10/2019 | Su | H01R 24/86 |
| 10,435,175 B2 | 10/2019 | Sure et al. | |
| D885,627 S | 5/2020 | Ludwig | |
| 10,886,679 B1 | 1/2021 | Hurtado | |
| 10,900,640 B2 | 1/2021 | Xia et al. | |
| D937,779 S | 12/2021 | Tang | |
| 11,421,867 B2 * | 8/2022 | Tang | A47B 19/10 |
| 11,484,341 B2 * | 11/2022 | Muse | A61M 5/3273 |
| 2002/0163812 A1 | 11/2002 | Tseng | |
| 2006/0146553 A1 | 7/2006 | Zeng et al. | |
| 2009/0161340 A1 | 6/2009 | Huang et al. | |
| 2009/0190348 A1 | 7/2009 | Lin | |
| 2010/0226023 A1 | 9/2010 | Lee | |
| 2012/0087142 A1 | 4/2012 | Schultheis et al. | |
| 2013/0286652 A1 | 10/2013 | Chiu | |
| 2014/0022782 A1 | 1/2014 | Tessnow et al. | |
| 2014/0046416 A1 | 2/2014 | Bennett et al. | |
| 2015/0216331 A1 | 8/2015 | Sanchez | |
| 2016/0047494 A1 | 2/2016 | Dickinson et al. | |
| 2016/0356466 A1 | 12/2016 | Recor et al. | |
| 2017/0272624 A1 | 9/2017 | Minikey, Jr. et al. | |
| 2018/0213627 A1 | 7/2018 | Xia et al. | |
| 2021/0116100 A1 | 4/2021 | Deng et al. | |
| 2021/0140611 A1 | 5/2021 | Zhou et al. | |
| 2021/0140617 A1 | 5/2021 | Tang et al. | |
| 2021/0239282 A1 | 8/2021 | Burt et al. | |
| 2021/0239287 A1 | 8/2021 | Gallaga et al. | |
| 2021/0254817 A1 | 8/2021 | Dyson et al. | |

OTHER PUBLICATIONS

United States Patent and Trademark Office; Non-Final Office Action for U.S. Appl. No. 16/999,319; dated Jan. 18, 2022; 6 pages.
United States Patent and Trademark Office; Non-Final Office Action for U.S. Appl. No. 17/039,249; dated Apr. 5, 2022; 5 pages.
United States Patent and Trademark Office; Notice of Allowance for U.S. Appl. No. 16/999,319; dated Apr. 28, 2022; 7 pages.
United States Patent and Trademark Office; Notice of Allowance for U.S. Appl. No. 17/039,249; dated Jul. 6, 2022; 8 pages.
United States Patent and Trademark Office; Notice of Allowance for U.S. Appl. No. 29/700,673; dated Sep. 15, 2021; 5 pages.

* cited by examiner

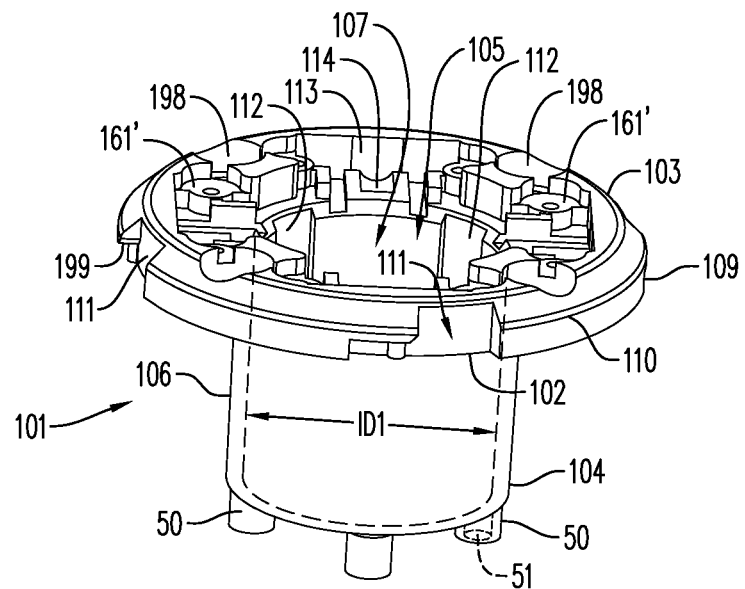
FIG. 4
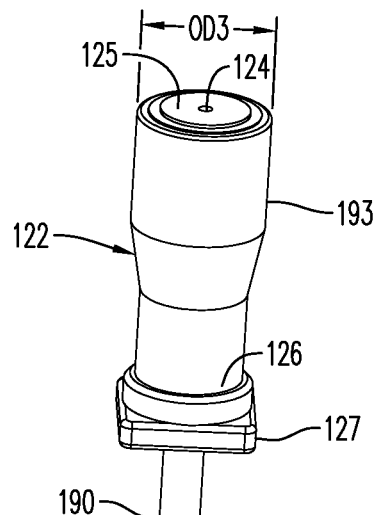
FIG. 5
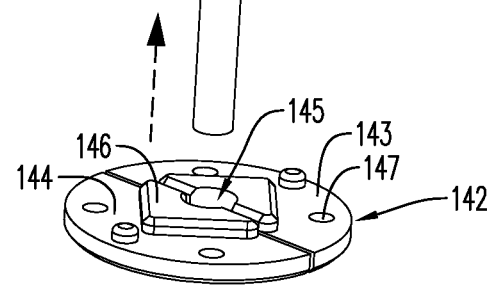

SUPPORT BASE FOR FURNITURE ACCESSORIES

CROSS-REFERENCE TO RELATED APPLICATIONS

This application is a continuation of U.S. application Ser. No. 16/999,319 filed Aug. 21, 2020, which claims priority to CN Patent Application No. 201911078975.5 filed Nov. 7, 2019, each of which is incorporated herein by reference.

BACKGROUND OF THE DISCLOSURE

This disclosure relates to a modular furniture item, in particular to a modular furniture item having a connection to an electrical accessory.

With the improvement of people's living standards, people's desire and expectation for a higher quality of life are steadily increasing. Traditional furniture can no longer meet people's requirements in daily life, giving way to more and more intelligent and versatile furniture in everyday life. For example, typical modular furniture items (i.e., furniture items assembled from a particular combination of standard constituent pieces) may include connections for detachable accessories. A connection for a detachable accessory is typically fixed to a base (i.e., an underlying frame, foundation, or supporting structure of the furniture item) of the modular furniture item, before completing assembly of the modular furniture item. The connection may generally be an equipment support base with a connecting hole or slot for receiving a corresponding connecting portion from a detachable accessory, and a receptacle and/or supporting structure for supporting and securing the detachable accessory in or on the base or a surface of the furniture item. The equipment support base is typically attached to the base by screw rods and nuts.

A typical detachable accessory for use with an equipment support base as discussed above may include an extended connecting column or a connecting key to connect and fix with the connecting hole or slot of the equipment support base. However, when the detachable accessory is not connected to the equipment support base (i.e., during shipment or in general use without the detachable accessory) the connecting hole or slot is exposed and dirt, dust, debris, ash, errant small items, etc. may collect on or fall into the equipment support base and/or block the connecting hole or slot. The blockage may damage or prevent the detachable accessory connection, if installation of the detachable accessory is later attempted. In addition, the exposed connecting hole or slot presents a safety risk for, e.g., small children's fingers, because the connecting hole may be designed to easily receive but strongly retain inserted pieces such as detachable accessories that the equipment support base must secure. Small children who are able to stick their fingers into the connecting hole may fracture their fingers when trying to pull them out.

In the event that a detachable accessory may be an electronic or electrical (collectively, "electrical") accessory, and the equipment support base should desirably provide a power connection for the electrical accessory, the typical equipment support base with electrical connections includes additional risks from electrical short and fire as a result of foreign materials/objects falling in and electric shock to people who touch exposed, hot power connections.

In view of the above deficiencies, there is a need for an equipment support base that safely and reliably provides a physical and electrical connection for a detachable, electrical accessory on or in a furniture item.

BRIEF DESCRIPTION OF THE EXEMPLARY EMBODIMENTS

According to an aspect, an exemplary embodiment includes a support base. The support base may include a connector hub that has a top end, and a bottom end spaced apart from the top end. A chamber wall may extend between the top and bottom ends and define a chamber. The support base may further include a flange that extends radially from the top end of the connector hub and an interface that is positioned in the chamber. According to an aspect, a maximum outer width of the interface may be less than an inner width of the chamber such that a support gap is defined between the interface and the chamber wall. The support gap may be dimensioned for receiving a wall of a support structure. The support structure may have a hollow interior into which the interface may be received.

In a further aspect, an exemplary embodiment includes a support base. The support base may include a connector hub having a top end, a bottom end spaced apart from the top end. A chamber wall may extend between the top end and the bottom end and define a chamber. According to an aspect, a flange may radially extend from the top end of the connector hub and define a flange groove. A baffle may be positioned in the flange groove. The flange groove may include a flange groove wall. A baffle spring may be positioned between the baffle and the flange groove wall of the flange groove. The baffle spring may be moveable between an uncompressed state and a compressed state. A power interface set may be positioned in the chamber. According to an aspect, a maximum outer width of the power interface set is less than an inner width of the chamber such that a support gap is defined between the power interface set and the chamber wall. The support gap and the baffle may be configured for removably receiving and securing a wall of a support structure. The support structure may have a hollow interior into which the power interface set may be received.

In a further aspect, an exemplary embodiment includes a support base. The support base may include a connector hub having a top end, a bottom end spaced apart from the top end. A chamber wall may extend between the top end and the bottom end and define a chamber. The support base may further include a power interface set that is positioned in the chamber. A flange may radially extend from the top end of the connector hub and define a flange groove. The flange groove may include a flange groove wall. A baffle may be positioned in the flange groove. A baffle spring may be positioned between the baffle and the flange groove wall of the flange groove. The baffle may be moveable by the baffle spring between a first position and a second position. The support base may further include a casing that is positioned between the power interface set and the chamber wall. According to an aspect, the baffle in the first position may at least partially overlap a space adjacent to the casing.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which:

FIG. 4 is a perspective view of a connector hub of a support base, according to an exemplary embodiment;

FIG. 5 is a perspective view of a power interface set and flange of a support base, according to an exemplary embodiment;

Figure 1:
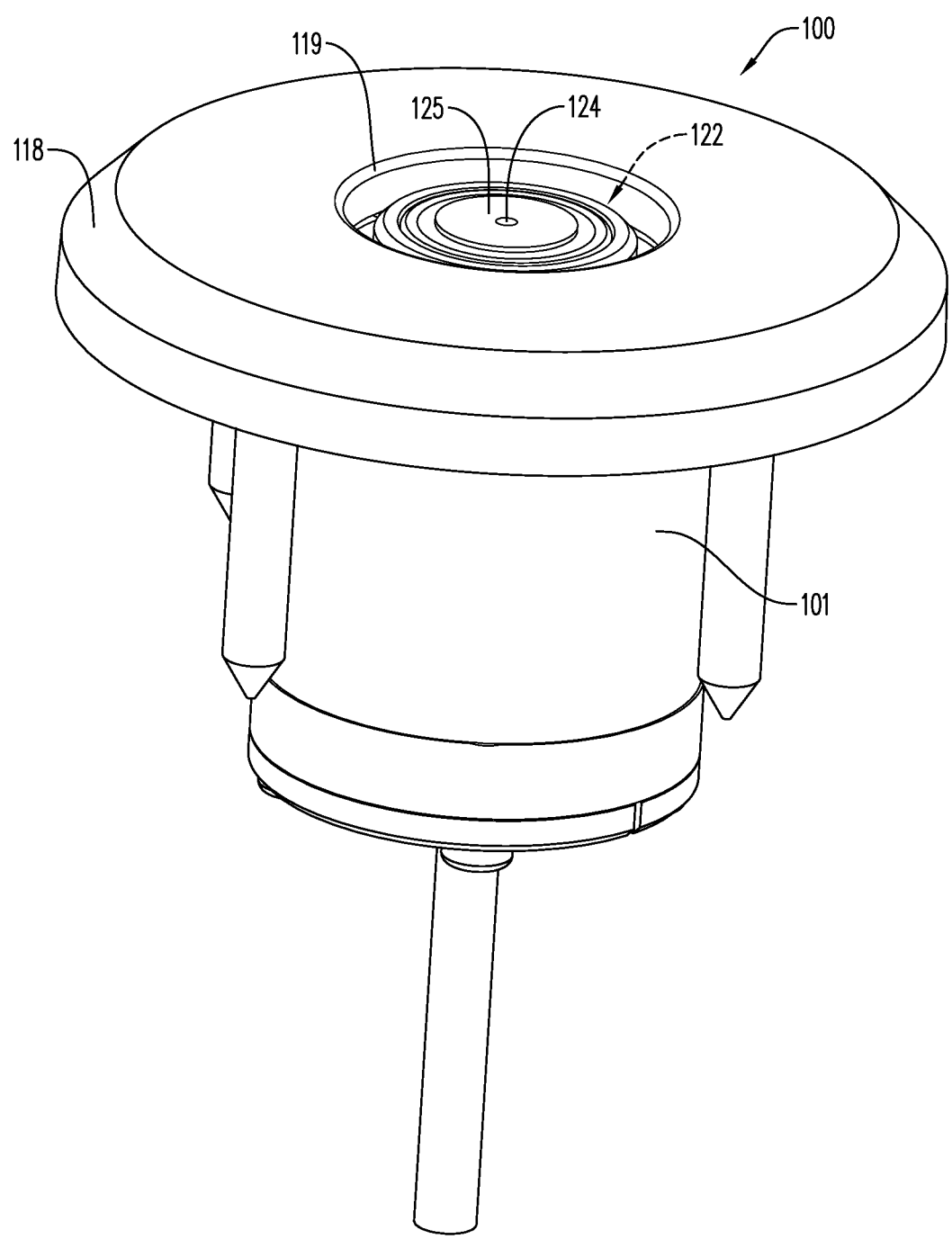
FIG. 1 is a perspective view of a support base, according to an exemplary embodiment.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to aid in understanding the features of the exemplary embodiments.

The headings used herein are for organizational purposes only and are not meant to limit the scope of the disclosure or the claims.

DETAILED DESCRIPTION

The exemplary embodiments include, among other things, a support base configured for connecting to one or more accessories such as, without limitation, a reading lamp, a mobile electronic device (e.g., smartphone, tablet, laptop computer, and the like) holder and/or charger, and a supporting surface for resting items, writing, etc. The one or more accessories may be detachable and interchangeable accessories and the support base may be configured for detachably connecting to the one or more accessories. It is contemplated that the accessories may be interchangeable. The support base may include a power interface set for electrically connecting and providing power to an electrical accessory such as a reading lamp or a mobile electronic device charger.

The support base may include a connector hub having a central hollow interior, and a power interface set positioned in the central hollow interior of the connector hub. According to an aspect, the power interface set may be configured for connecting to an external power source, such as a standard wall outlet, and supplying power to an electrical accessory, such as a reading lamp or a mobile electronic device.

In an exemplary embodiment, a cover plate covers a non-functional area (i.e., an area to which a detachable accessory does not require direct access for physically or electrically connecting) of the support base, which is on the upper surface of the support base. The cover plate may prevent unwanted materials, such as debris, dust, and the like, from entering the non-functional areas of the support base. The cover may also be designed/provided for aesthetics.

In an aspect, a baffle within the connector hub may be elastically pressed inwardly towards the central hollow interior, through an annular support gap formed in a chamber of the connector hub and in which the detachable accessory may be received, to prevent foreign materials including, e.g., fingers, from entering the annular support gap when the detachable accessory is not connected and stabilizing the detachable accessory when it is connected.

In an exemplary embodiment, the connector hub is cylindrical. The top of the connector hub may include a flange circumferentially disposed about a top portion/top end of the connector hub. The edge of the flange may be provided with a set of slots for securing the cover plate to the connector hub. According to an aspect, the upper surface of the flange may include a flange groove for receiving the baffle.

According to an aspect, the baffle may include springs positioned between the baffle and a flange wall adjacent the flange groove, for biasing the baffle towards the central hollow interior In an exemplary embodiment, the power interface set may be positioned in a lumen formed within a casing. The power interface set and casing/lumen may be dimensioned for the power interface set to fit snugly within the lumen. The casing may include a casing flange formed at a bottom end of the casing and including a casing flange slot and pin receptacle for fasteners to connect components of the support base.

In an exemplary embodiment, the support base may include a tubing collar that may be a fluorescent tube rack. The tubing collar may be formed from at least one of plastic, resin and rubber. The tubing collar may be dimensioned such that it fits within the chamber of the connector hub. An annular support slot may be formed between the tubing collar and the casing and correspond to a thickness of a portion of a detachable accessory inserted into the support base. The tubing collar may include a buckling element formed on the tubing collar, for connecting to the casing flange slot.

Reference will now be made in detail to the exemplary embodiments. Each exemplary embodiment is provided by way of explanation and illustration, and without limitation. The exemplary embodiments do not constitute a definition of all possible embodiments, whether as a whole or with respect to individual features. For example, the components (individually, collectively, or relative to others) of an exemplary support base as described throughout the disclosure may have any geometry, dimension(s), and/or configuration(s) consistent with the disclosure.

For purposes of this disclosure, each of the phrases "device(s)," "system(s)," and "method(s)" may be used for general reference and without limitation to any particular component, grouping, arrangement, step, function, process, or combination thereof, except where expressly indicated otherwise.

FIG. 1 illustrates an assembled view of a support base 100 according to an exemplary embodiment. In the exemplary embodiment shown in FIG. 1, the support base 100 includes a connector hub 101 and a power interface set 122 positioned in the connector hub 101. A cover plate 118 is coupled or otherwise secured to a top end 102 of the connector hub 101. An electrically contactable top end 125 of the power interface set 122 may be aligned with a cover plate hole 119 (i.e., void) formed in the cover plate 118, such that the cover plate 118 is annular. In an exemplary embodiment, the power interface set 122 is dimensioned such that, among other things, the electrically contactable top end 125 will make electrical contact with an accessory electrical interface 165 (FIGS. 11 and 12) of a detachable accessory (e.g., 167), when the detachable accessory is attached to the support base 100.

Figure 2:
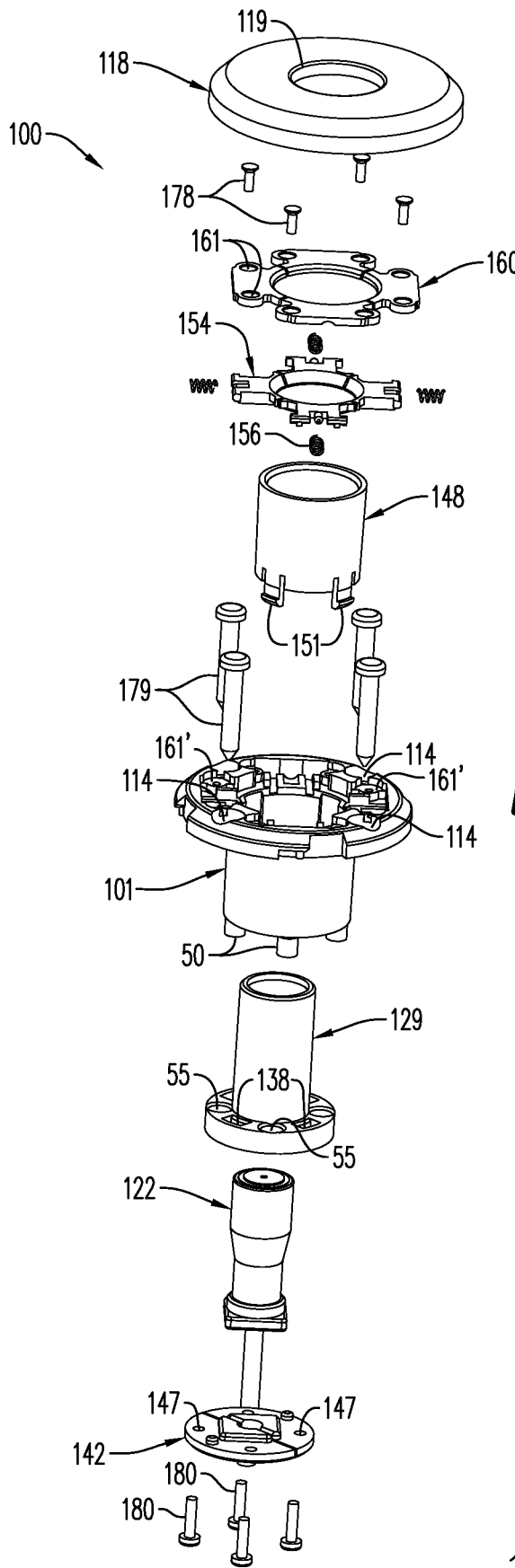
FIG. 2 is an exploded view of a support base, according to an exemplary embodiment.

FIG. 2 shows an exploded view of the exemplary support base 100 shown in FIG. 1 and illustrates various components that may be included in an exemplary embodiment of the support base 100. Each component may cooperate with an adjacent component or be arranged such that the support base 100 supports, for example, various devices, such as mobile electronic devices, power terminals and cords, mounts or holders for mobile phones and tablet computers, reading lamps, and the like. In an aspect, electrical devices may be powered by the power interface set 122 with an appropriate connection thereto.

Figure 3:
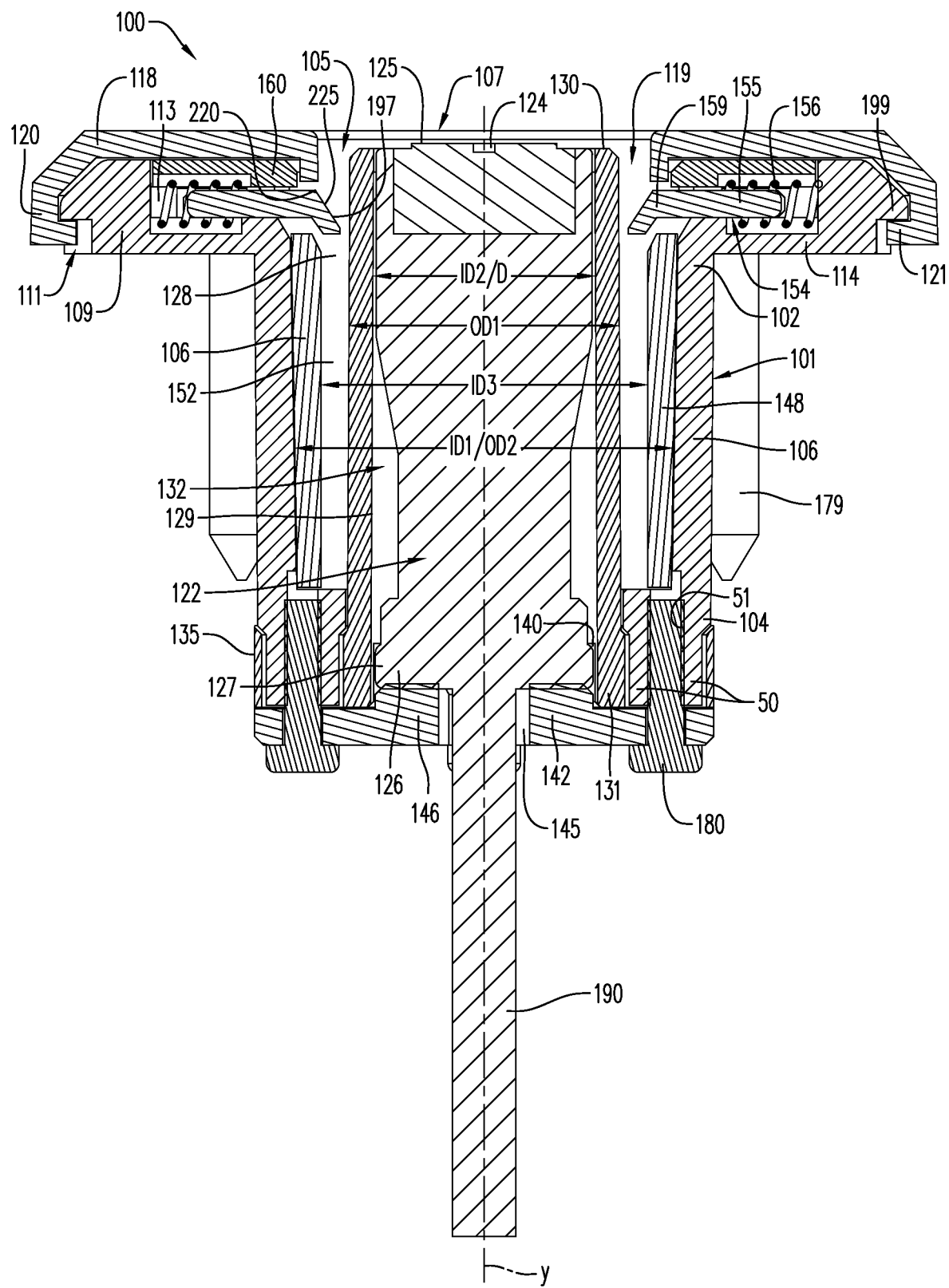
FIG. 3 is a cross-sectional view of the support base of FIG. 1.

With reference to FIG. 3 and FIG. 4, an exemplary embodiment of the connector hub 101 is illustrated in additional detail. The exemplary connector hub 101 shown in FIGS. 3 and 4 is formed as an annular cylinder that has the top end 102 and a bottom end 104 opposite and spaced apart from the top end 102, and a chamber wall 106 extending from the top end 102 to the bottom end 104. The chamber wall 106 defines a chamber 105 that extends between the top end 102 and the bottom end 104. A central hollow interior 107 of the connector hub 101 extends, in the exemplary embodiments, along a longitudinal center axis 'y' of the chamber 105. For purposes of this disclosure, the central hollow interior 107 is a region or portion of the chamber 105 that is defined, without limitation, by the relative position and configuration of components described with respect to the central hollow interior 107 and to aid in the description of those and other components.

According to an aspect, a flange 109 radially extends from the top end 102 of the connector hub 101. The flange 109 has an outer diameter that is larger than a corresponding outer diameter of the connector hub 101. The flange 109 includes a flange slot 111 formed in an outer edge 110 of the flange 109 and extending generally from the outer edge 110 towards the central hollow interior 107 of the connecter hub 101. The flange slot 111 may be, e.g., a depression or a gap that is formed in the outer edge 110 of the flange 109. According to an aspect, the flange slot 111 may be configured to receive one or more pins, protrusions, or the like, to fasten a component to the connector hub 101. For example, and as illustrated in FIG. 3, the cover plate 118 is mechanically coupled to the flange 109. The cover plate 118 may include a fastening mechanism, such as one or more tabs 121 that are inserted into corresponding flange slots 111 (FIGS. 3 and 4) and then rotated to secure the tabs 121 beneath an eave portion 199 of the outer edge 110 of the flange 109. According to an aspect, the flange 109 may further include one or more fixing holes 114 (FIGS. 2 and 4) through which pins, fasteners, and the like may be passed to connect components of the support base 100 and/or to connect the support base 100 to a furniture item. A plurality of grooves 112 (FIG. 4) may be formed in the chamber wall 106 and extend along the axial direction of the connector hub 101. The grooves 112 may be configured for accommodating a buckling element 151 of a tubing collar 148 as it is inserted into the chamber 105, as described further below.

The bottom end 104 of the connector hub 101 may include a plurality of cylindrical protruding structures 50, each with a receptacle 51 formed within the cylindrical protruding structure 50. Without limitation, the cylindrical protruding structure 50 in the exemplary embodiment shown in, e.g., FIG. 3 and FIG. 4, may be formed integrally with a portion of the chamber wall 106 and a portion of the cylindrical protruding structure 50 may be positioned within the chamber 105, such that the cylindrical protruding structure 50 extends from a position within the chamber 105 to a position below the bottom end 104 of the connector hub 101. As illustrated in FIG. 3, the receptacle 51 of the cylindrical protruding structure 50 may be configured for receiving a fastener 180 to join components of the support base 100. For example, the receptacle 51 may include a threaded portion for connecting to a screw.

The power interface set 122 is positioned in the central hollow interior 107 of the connector hub 101 (FIG. 3). With reference to FIG. 3 and FIG. 5, the power interface set 122 has an outer diameter OD3 that is less than an inner diameter ID1 of the chamber 105 as defined by the chamber wall 106 of the connector hub 101. For purposes of this disclosure, the inner diameter ID1 of the chamber 105 refers to a minimum inner diameter of the chamber 105 and is defined by portions of the chamber wall 106 in which the grooves 112 are not formed. This forms an annular support gap 128 between the power interface set 122 and the chamber wall 106. As described further below, at least a portion of a casing 129 and a tubing collar 148 may be positioned within the chamber 105 and in the annular support gap 128 (i.e., between the power interface set 122 and the chamber wall 106), thereby defining an annular support slot 152 portion of the annular support gap 128, between the casing 129 and the tubing collar 148. While a width of the annular support gap 128 between the chamber wall 106 and the power interface set 122 may vary because, for example, grooves 112 are formed in the chamber wall 106, the annular support slot 152 in the exemplary embodiment is substantially constant between the cylindrical tubing collar 148 and the casing 129.

In an exemplary embodiment, the power interface set 122 at, e.g., the electrically connectable top end 125 and/or an electrical connection (e.g., female connector 124 (FIGS. 3 and 11)) thereon, may include a magnetic joint power interface set configured for connecting to another electrical interface by attractive magnetic force. In the same or other embodiments, the power interface set 122 may include a direct current (DC) electric circuit that may include wired connections.

With further reference to FIG. 5, a power interface set flange 127 may be formed on a bottom end 126 of the power interface set 122. A circular circuit 190 may extend downwardly away from the power interface set flange 127. The circular circuit 190 may be configured for and, in use, electrically connected to, an electrical receptacle or connection assembly (not shown) within the furniture item and/or a connection to a power source such as, without limitation, a wall outlet. In an exemplary use, a power source such as a wall outlet would provide power to the circular circuit 190 via the electrical receptacle assembly or the like, and the circular circuit 190 would relay the power to the power interface set 122. Thus, the circular circuit 190 is in electrical communication with the power interface set 122, and the power interface set 122, the power interface set flange 127, and the circular circuit 190 may be assembled or formed together in any manner consistent with this disclosure and safely insulating and grounding the components subject to a voltage or electric current.

According to the exemplary embodiment shown in FIG. 3 and FIG. 5, the bottom end 126 of the power interface set 122 and the power interface set flange 127 are between the electrically contactable top end 125 of the power interface set 122 and the protrusion of the circular circuit 190 therefrom. The circular circuit 190 may be positioned in a circular circuit through-hole 145 (FIG. 5) formed in the center of a pressing block structure 142. The pressing block structure 142 may include a first half-section 143 and a second half-section 144, with each of the half-sections 143, 144 including a portion of the circular circuit through-hole. According to an aspect, the pressing block structure 142 includes a square protruding structure 146 set at a position corresponding to the shape of the power set interface flange 127. The pressing block structure 142 is provided with a set of screw fixing holes 147, and the positions of the screw fixing holes 147 correspond to the positions of the cylindrical protruding structures 50 formed at the lower end of the connector hub 101. According to an aspect, fasteners 180 (FIG. 2) may be positioned in the screw fixing holes 147 and dimensioned so that they extend through the screw fixing holes 147 of the pressing block structure 142 and through a pin receptacle 55 of the casing 129 (FIG. 9) in which the cylindrical protruding structures 50 of the connector hub 101 are also inserted to receive the fasteners 180 in the receptacles 51.

Figure 6:
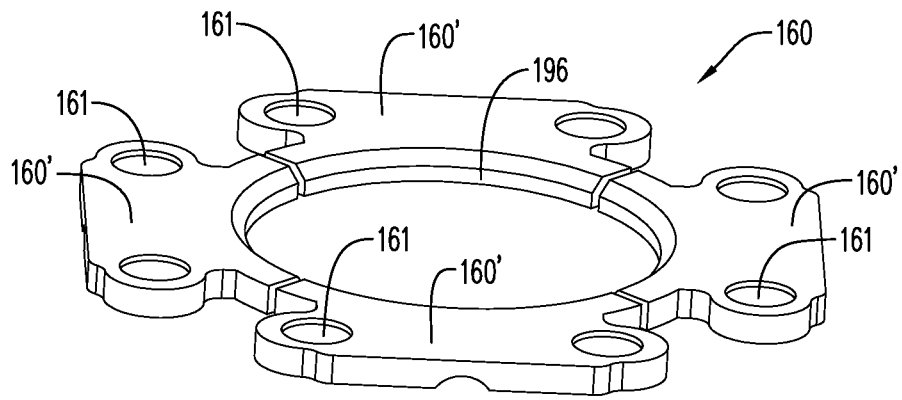
FIG. 6 is perspective view of a spring pressing block of a support base, according to an exemplary embodiment.
Figure 7:
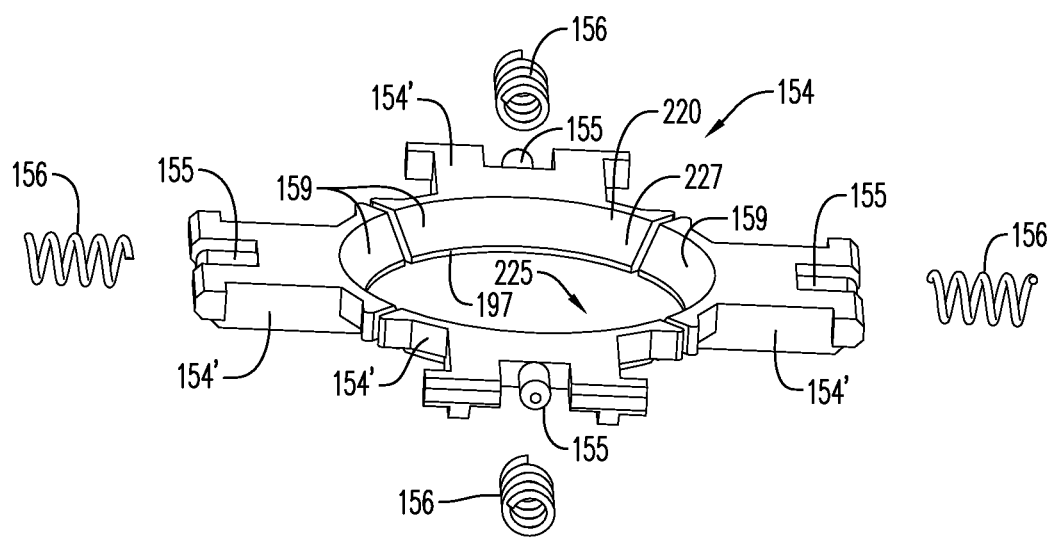
FIG. 7 is a perspective view of a baffle assembly of a support base, according to an exemplary embodiment.

According to an aspect and illustrated in FIG. 6 and FIG. 7, the exemplary support base 100 may include a baffle 154 and a spring pressing block 160.

An exemplary baffle 154 is illustrated in FIG. 7. The baffle 154 may be made of multiple portions 154'. Each baffle portion 154' may include an inner portion 159 that is dimensioned such that each inner portion 159 cooperates with the inner portion 159 of adjacent baffle portions 154' to define a circular boundary 197, a circular receiving portion 220, and a fluted section 225 of the baffle 154. For purposes of this disclosure, an "inner portion 159 of the baffle 154" refers to the overall configuration of the collective inner portions 159, including the portions that form the circular receiving portion 220 and the circular boundary 197, of the baffle portions 154' in an assembled state (such as shown in FIG. 7) or after being displaced within the support base 100 (as described further below).

With continuing reference to FIG. 7, and further reference to FIG. 3, the circular receiving portion 220 has a diameter that is greater than a diameter of the circular boundary 197. A sloped wall 227 of the inner portion 159 of the baffle 154 extends inwardly (i.e., towards the central hollow interior 107) from the circular receiving portion 220 to the circular boundary 197.

The sloped wall 227 defines a fluted section 225 of the baffle 154. The fluted section 225 extends from the circular receiving portion 220 to the circular boundary 197 and has a corresponding diameter at each point along the sloped wall 227. In an aspect, a diameter of the fluted section 225 adjacent the circular receiving portion 220 may be greater than a diameter of the fluted section 225 adjacent the circular boundary 197, and the fluted section 225 is frustoconically-shaped. In other aspects, the circular boundary 197 may be a portion of the inner end 159 of the baffle 154 at which the fluted section 225 has a minimum diameter and/or the connection end 163 of the detachable electronic accessory will contact or engage the baffle 154, as discussed further below. The exemplary configuration of the baffle 154, including, among other things, the fluted section 225, contributes to the function of the baffle 154 when a connection end 163 (FIGS. 11 and 12) of the detachable electrical accessory is inserted into the support base 100, as described further below.

Each baffle portion 154' is further configured for being positioned in a flange groove 114 (FIG. 3) formed in an upper surface 103 of the flange 109. According to an aspect, the baffle 154 helps to prevent foreign materials or objects including, e.g., fingers, from entering the annular support gap 128, and also functions as a clamp to support the detachable accessory when it is attached to the support base 100 (i.e., inserted in the annular support slot 152) as described further below. For example, each baffle portion 154' may include or be outfitted with a baffle spring 156 that is positioned between the baffle portion 154' and a corresponding flange groove wall 113 adjacent to a respective flange groove 114 in which each baffle portion 154' is seated in the upper surface 103 of the flange 109. In an aspect, the baffle springs 156 may be sleeved on baffle spring guide columns 155. The baffle springs 156 are at least partially elastically compressible so that they move between a compressed state and an uncompressed state. In an aspect, when the baffle springs 156 are in the uncompressed state, a biasing force of the baffle springs 156 is in a direction towards the central hollow interior 107 and the inner portions 159 of the baffle portions 154' extend into the annular support slot 152. For purposes of this disclosure, a position, geometry, or configuration of the baffle 154/baffle portions 154' is not limited with respect to the annular support slot 152, i.e., the tubing collar 148 and casing 129, and embodiments in which the baffle 154/baffle portions 154' "extend" into the annular support slot include, for example, configurations in which the baffle 154 and/or one or more baffle portions 154' overlap or are positioned in part within the annular support slot 152, consistent with this disclosure. In the compressed state, the baffle springs 156 exert an opposing force against a force applied to, e.g., the inner portions 159 of the baffle portions 154', in the direction towards the flange groove wall 113. The force applied to the inner portions 159 of the baffle portions 154' may move the inner portions 159 of the baffle portions 154' part or all of the way out of the annular support slot 152.

The spring pressing block 160 (FIG. 6) may be positioned between the cover plate 118 and the baffle 154 and the upper surface 103 of the flange 109. The spring pressing block 160 may include a plurality of spring pressing block portions 160' corresponding to the baffle portions 154' and also shaped to define a circular boundary 196. The circular boundaries 196, 197 of the spring pressing block 160 and the baffle 154 may be aligned or concentric with each other and with the annular support slot 152, the annular support gap 128, and/or the chamber 105, about the longitudinal axis y.

According to an aspect, the spring pressing block 160 is installed above the baffle 154. The spring pressing block 160 may be positioned above the baffle 154 in between the upper surface 103 of the flange 109 and the cover plate 118. Thus, the spring pressing block 160 may cover the baffle 154 and the baffle springs 156 and prevent foreign materials from getting into the flange grooves 114 and potentially seizing the baffle springs 156. The spring pressing block 160 may be secured to the upper surface 103 of the flange 109 by a fastener 178 that extends through a fixing hole 161 of the spring pressing block 160 and into a receiving hole 161' (FIGS. 2 and 5) formed in the upper surface 103 of the flange 109. The fastener 178 may be, without limitation, a threaded screw that connects to corresponding threading in the receiving hole 161'. According to an aspect, the spring pressing block 160 may thereby secure the baffle 154 in place.

The spring pressing block 160, in combination with the baffle 154 and the baffle springs 156, may work together as an elastic baffle structure. For example, in an exemplary use when a detachable electrical accessory 167 (FIGS. 11-12) is attached to the support base 100, a portion 195 of the detachable electrically accessory 167 is received within the support base 100 and extends from the cover plate hole 119 to the annular support slot 152, and forces the baffle portions 154' in a direction away from the central hollow interior 107 by compressing the baffle springs 156. The opposing bias force urges the inner portions 159 of the baffle portions 154' against the portion 195 of the detachable electrical accessory 167 within the support base 100, thereby stabilizing the detachable electrical accessory within the support base 100.

Figure 8:
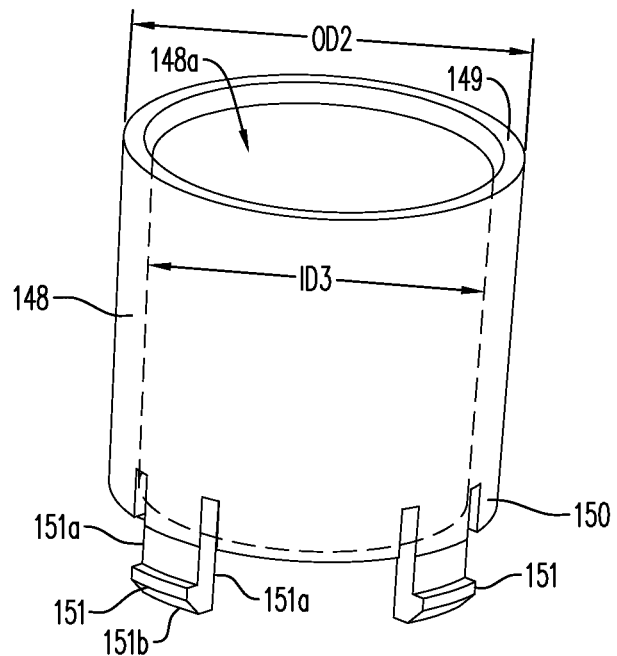
FIG. 8 is a perspective view of a tubing collar of a support base, according to an exemplary embodiment.
Figure 11:
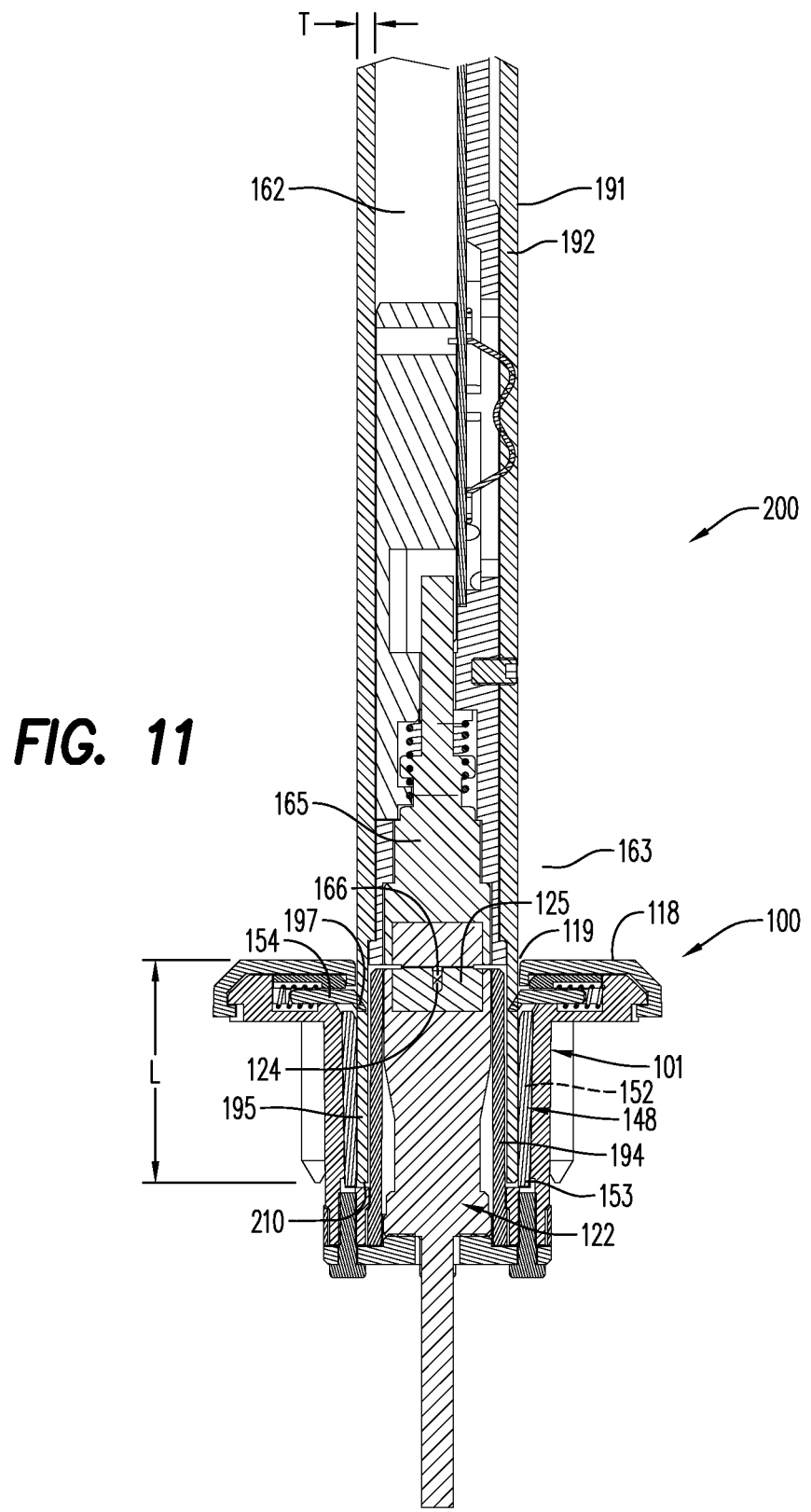
FIG. 11 is a cross-sectional view of a connection between an electrical accessory and a support base, according to an exemplary embodiment.
Figure 12:
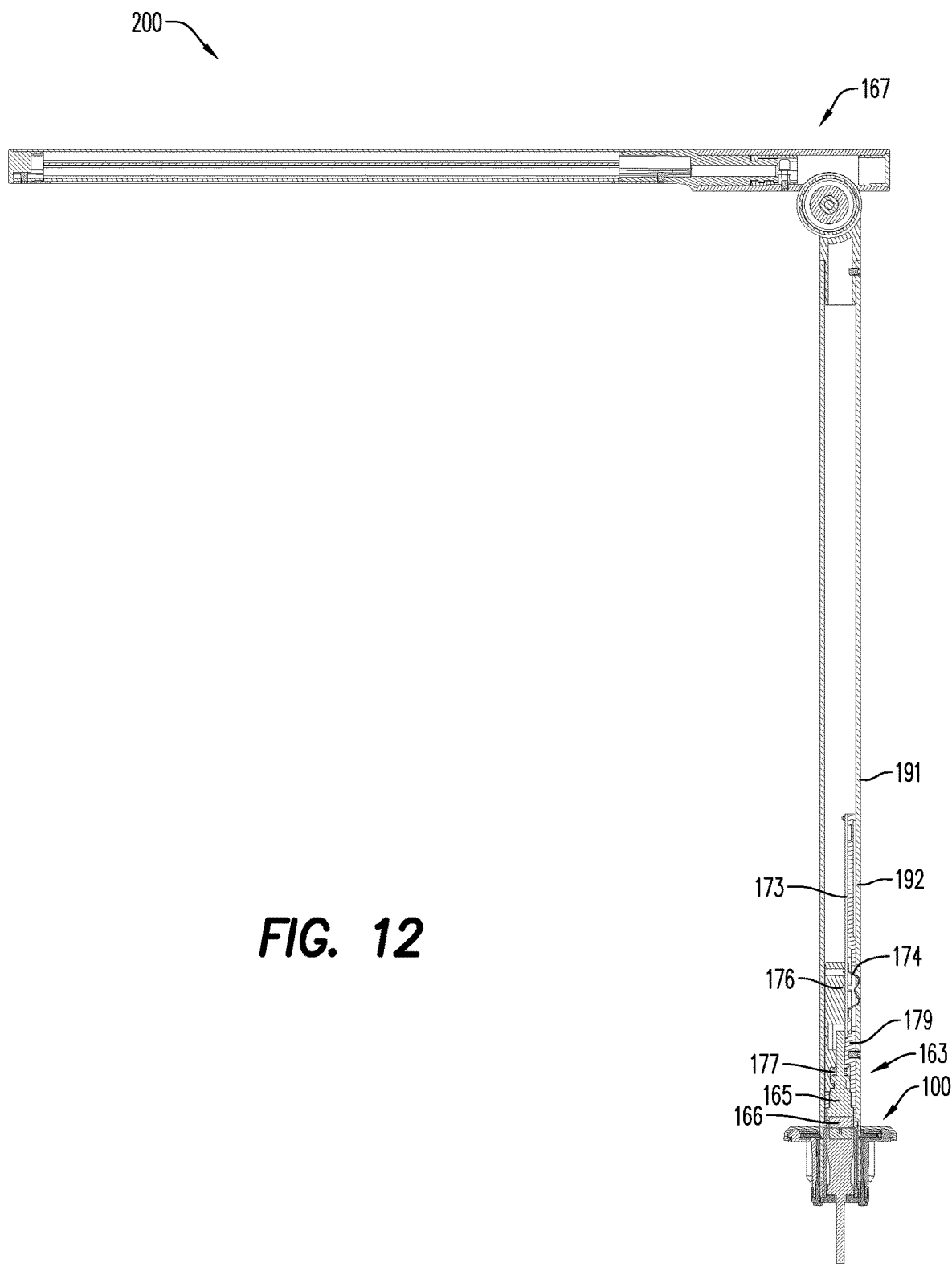
FIG. 12 is a cross-sectional view of an electrical accessory connected to a support base, according to an exemplary embodiment.

With reference now to FIG. 8, an exemplary tubing collar 148 for use with the support base 100 is shown. As previously discussed, the tubing collar 148 is positioned within the chamber 105, between the chamber wall 106 and the casing 129 (FIG. 3). According to an aspect of the exemplary embodiment shown in FIG. 3, an outer diameter OD2 of the tubing collar 148 is substantially equal to the inner diameter ID1 of the chamber 105 and the tubing collar 148 is generally flush against the portions of the chamber wall 106 in which the grooves 112 are not formed, or minimal space exists therebetween, to minimize potential flexing or "play" that the tubing collar 148 may experience when the detachable electrical accessory 167 is attached to the support base. For purposes of this disclosure, relative terms such as "substantially" and "generally" may be understood from the context of the disclosure in view of the figures and are not limited to any particular value, tolerance, relationship, etc. For example, neither "substantially equal" nor "generally flush," as used above with respect to the exemplary embodiments, is limited to any particular relationship that is not inconsistent with this disclosure, between the tubing collar 148 and the chamber wall 106. An inner diameter ID3 of the tubing collar 148 is greater than the outer diameter OD1 of the casing 129, and the annular support slot 152 has a width equal to the difference between the inner diameter ID3 of the tubing collar 148 and the outer diameter OD1 of the casing 129. With reference to FIGS. 11 and 12, and the exemplary use discussed above, the width of the annular support slot 152 may correspond to a wall thickness 'T' of a connection end 163 of the detachable electrical accessory 167, such that the connection end 163 may fit snugly within the annular support slot 152 when it is attached to the support base 100, as described further below.

With reference again to the exemplary embodiment shown in FIG. 8, the tubing collar 148 has a top end 149 and a bottom end 150 opposite the top end 149. A light source (not shown), such as an LED tube, may extend around the top end 149 of the tubing collar 148 or may be integral thereto. The light source may receive power from a separate lead from the power source for the power interface set 122, according to known techniques. The light source may provide lighting to the annular support slot 152 so a user can find it in the dark. According to an aspect, the buckling element 151 is positioned adjacent the lower end 150 of the tubing collar 148 and may extend therefrom. The buckling element 151 is dimensionally configured to be received in a casing flange slot 138 of the casing 129. The casing flange slot 138 may be configured as a square groove formed in the casing 129 and the buckling element 151 may be resilient and shaped complementarily to the casing flange slot 138, to form a positive locking engagement with the casing flange slot 138 according to known techniques. The tubing collar 148 may be dimensioned and arranged so that at least a portion of the casing 129 is positioned within an interior portion 148a of the tubing collar 148. In this configuration, the buckling element 151 may be inserted and secured into the casing flange slot 138. According to an aspect, the buckling element 151 in the exemplary embodiment includes two spaced apart side walls 151a, and an engagement portion 151b extending between the side walls. The engagement portion 151b may be contoured such that it can be engaged and retained within the casing flange slot 138 to connect the tubing collar 148 to the casing 129. The buckling element 151 may be formed from a variety of resilient materials, such as plastics and the like, consistent with this disclosure. The tubing collar 148 in the exemplary embodiments may be formed from, without limitation, one of plastic, resin, and rubber.

Figure 9:
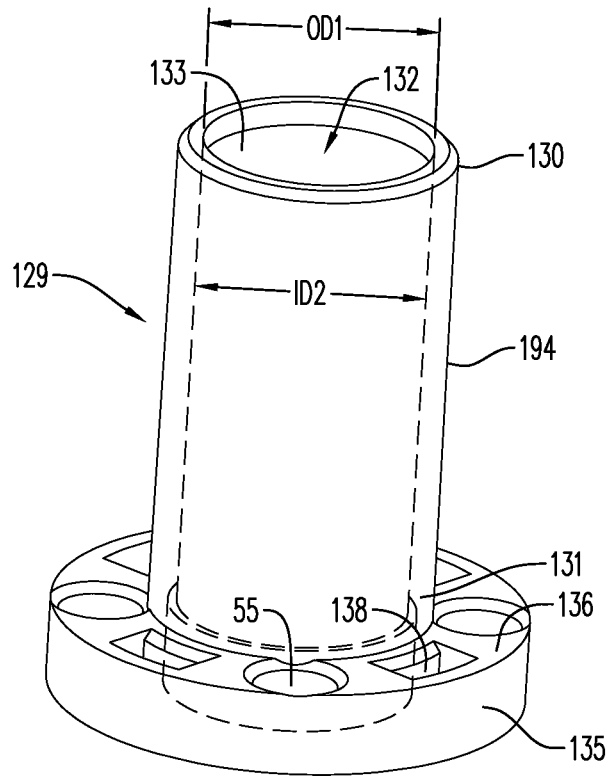
FIG. 9 is a perspective view of a casing of a support base, according to an exemplary embodiment.
Figure 9A:
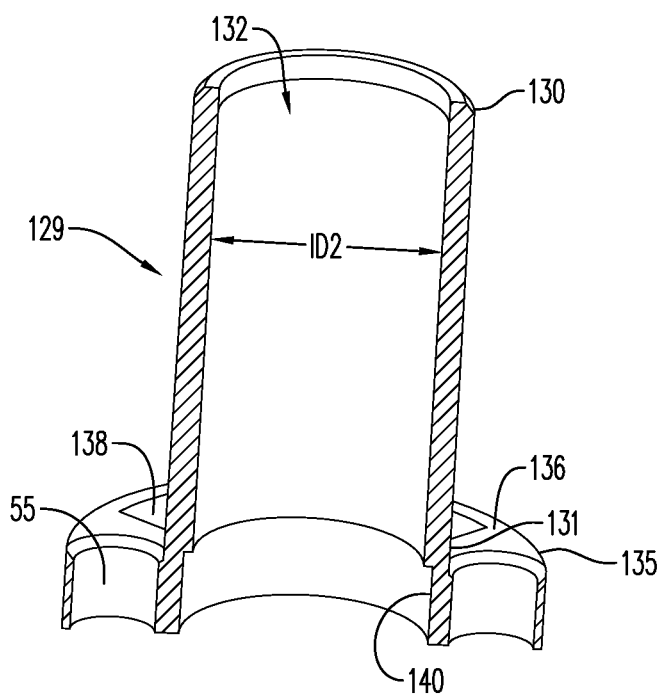
FIG. 9A is a cross-sectional view of the casing of FIG. 9.

With reference now to FIGS. 9 and 9A, an exemplary embodiment of the casing 129 is shown. The casing 129 has a top end 130 and a bottom end 131 opposite the top end 130, and a casing wall 194 extending from the top end 130 to the bottom end 131. The casing wall 194 defines a lumen 132 that extends from a casing lumen upper opening 133 at the top end 130 of the casing 129 to a casing lumen lower opening 134 at the bottom end 131 of the casing 129. According to an aspect, the casing 129 is positioned in the annular support gap 128, between the chamber wall 106 and the power interface set 122, and the power interface set 122 is positioned within the lumen 132. The power interface set 122 and the casing 129 (including the lumen 132) are complementarily dimensioned and configured for the power interface set 122 to fit snugly and in a maintained position within the lumen 132. For example, the casing 129 may be cylindrical. At least a portion 193 of the power interface 122 may include a cylindrical outer profile/contour that has a maximum outer diameter (i.e., OD3) that can be securely fit within an inner diameter ID2 of the casing 129, which may be a diameter of the lumen 132. The outer diameter OD3 of the power interface set 122 may such that the portion 193 of the power interface set 122 including the maximum outer diameter OD3 will sit flush against an inner surface of the casing wall 194, within the lumen 132.

The casing 129 may further include a casing groove 140 formed inside the lumen 132, adjacent the bottom end 131 of the casing 129. The casing groove 140 may be configured to receive and secure the power interface set flange 127.

According to an aspect and as further illustrated in FIGS. 9 and 9A, the casing 129 further includes a casing flange 135. The casing flange 135 radially extends from the casing 129 and is adjacent the bottom end 131 of the casing 129. The aforementioned casing flange slot 138 extends through an upper surface 136 of the casing flange 135, such that the buckling element 151 of the tubing collar 148 can be received and retained therein. When the buckling element 151 is positioned in the casing flange slot 138, the lower end 150 of the tubing collar 148, in an exemplary embodiment, is adjacent the upper surface 136 of the casing flange 135, and the tubing collar 148 is mechanically coupled to the casing flange 135. A plurality of casing flange slots 138 may be provided, with each slot of the plurality of casing flange slots 138 being spaced apart from each other with a pin receptacle 55 positioned therebetween. The pin receptacles 55 are positioned to respectively align with a corresponding one of the screw fixing holes 147 in the pressing block structure 142 and the cylindrical protrusions 50 from the connector hub 101. In the exemplary embodiments shown in FIGS. 2 and 3, the cylindrical protrusions 50 are received within the pin receptacles 55 and fasteners 180 may be received within the screw fixing holes 147 and extend therefrom into the pin receptacles 55 within which they are received further within the receptacles 51 of the cylindrical protrusions 50 and connected thereto, for example, by a threaded connection or other known technique.

Figure 10:
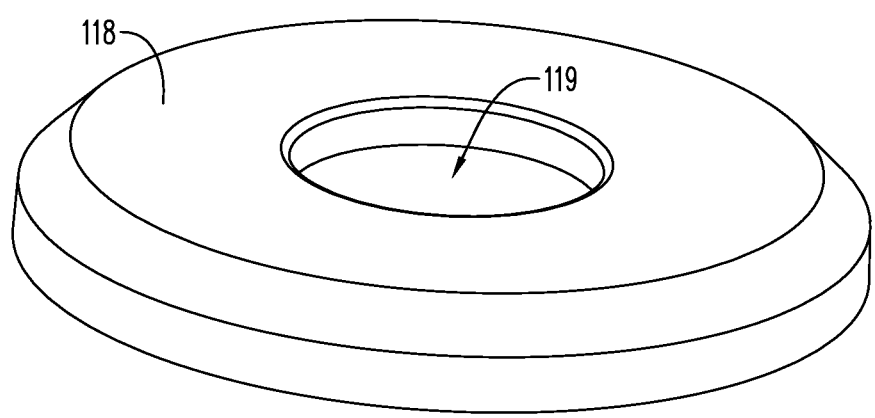
FIG. 10 is a perspective view of a cover plate of a support base, according to an exemplary embodiment.

With reference now to FIG. 10, an exemplary cover plate 118 of the support base 100 is shown. As previously described with respect to FIG. 3, the cover plate 118 in the exemplary embodiment is mechanically coupled to the top end 102 of the connector hub 101 and includes the cover plate hole 119 positioned to axially align with the central hollow interior 107 of the connector hub 101. The cover plate hole 119 may be provided in the cover plate 118 to expose the area, including, e.g., the chamber 105 including the annular support gap 128, annular support slot 152, and the central hollow interior 107 in which the power interface set 122 and the detachable electrical accessory 167 are received.

The detachable electrical accessory 167 may be inserted through the cover plate hole 119 and attached to the support base 100 as previously described. The exemplary configuration of the support base 100 as described with respect to, e.g., FIGS. 2 and 3, and the connection end 163 of the detachable electrical accessory 167 are correspondingly dimensioned (as described further below) to establish an electrical connection upon attaching the detachable electrical accessory 167 to the support base 100. For example, the electrical connection may be made when the portion 195 of the detachable electrical accessory 167 is fully received within an axial length of the annular support slot 152.

With reference now to FIGS. 11 and 12, an assembly 200 including the detachable electrical assembly 167 attached to the support base 100 is shown, according to exemplary embodiments. The support base 100 may be the exemplary support base 100 and components as described above with respect to FIGS. 1-10, which description is understood to form a part of the exemplary embodiments of FIGS. 11 and 12. For example, a configuration of the exemplary support base 100 includes the power interface set 122 and casing 129 positioned in the central hollow interior 107 of the chamber 105/connector hub 101. The annular support slot 152 extends radially from the casing wall 194 to the tubular collar 148.

The assembly 200 includes a physical and electrical connection between the support base 100 and the connection end 163 of a detachable electrical accessory 167. In FIG. 11, an exemplary connection between the connection end 163 and the support base 100 is shown in isolation, and the connection end 163 may be part of any detachable electrical accessory configured consistently with this disclosure. In FIG. 12, the detachable electrical accessory is a reading lamp 167, according to an exemplary embodiment.

With reference to FIG. 11, specifically, in the exemplary assembly 200 the connection end 163 of the detachable electrical accessory includes a hollow cylindrical support tube 191 including a tube wall 192 having a thickness 'T' and defining a hollow interior 162 of the support tube 191. The connection end 163 is inserted into the support base 100 through the cover plate hole 119. The portion 195 of the connection end 163 that is received within the support base 100 extends, without limitation, through the cover plate 119 and along a length 'L' from the top surface 125 of the power interface set 122 to a bottom end 153 of the annular support slot 152. An open bottom end 210 of the support tube 191 defines an opening to the hollow interior 162, through which opening the hollow interior 162 receives the power interface set 122 and the casing 129 when the connection end 163 is attached to the support base 100.

According to an aspect, the thickness T of the tube wall 192 is substantially equal to the width of the annular support slot 152 (i.e., the difference between the outer diameter OD1 of the casing 129 and the inner diameter ID3 of the tubing collar 148, as described above), such that the tube wall 192 fits snugly within the annular support slot 152 within which it is secured and supported. The connection end 163, when inserted into the support base 100, passes through the fluted section 225 of the baffle 154 from the circular receiving portion 220 to the circular boundary 197 of the baffle 154, and extends past the circular boundary 197 to complete the attachment to the support base 100, as described further below. In the exemplary embodiment shown and described with respect to, e.g., FIGS. 3 and 7, the diameter of the circular receiving portion 220 is greater than a diameter of the support tube 191 at the connection end 163 and the diameter of the circular boundary 197 of the baffle 154 is less than the diameter of the support tube 191 at the connection end 163. The diameter of the fluted section 225 gradually decreases from the circular receiving portion 220 to the circular boundary 197.

In an aspect, as the connection end 163 is inserted into the support base 100 and passes through the circular receiving portion 220 and then the fluted section 225, the connection end 163 will, at some point, encounter a portion of the inner end 159 of the baffle 154 at which a diameter of the fluted section 225 is substantially equal to an outer diameter of the connection end 163. As force is applied to push the connection end 163 past the baffle 154 after contacting the inner portion 159 of the baffle 154, the support wall 192 of the support tube 191 overcomes the biasing force of the baffle springs 156 and displaces the respective baffle portions 154' towards the corresponding groove walls 113. The opposing force of each baffle spring 156 pushes the corresponding baffle portion 154' in the direction from the corresponding groove wall 113 towards the central hollow interior 197. In an aspect of the exemplary embodiments, the opposing force from the baffle springs 156 maintains an engagement between the inner portion 159 of the baffle 154 and the support wall 192 and stabilizes the connection end 163.

The sloped wall 227 of the collective inner portion 159 of the baffle 154 or respective inner portions 159 of the baffle portions 154' may include any profile consistent with this disclosure or particular applications. For example, the sloped wall 227 in the exemplary embodiments is dimensioned to allow the connection end 163 to enter the fluted section 225 within which the connection end 163 may contact and apply a force in the radial direction to the inner portion 159 of the baffle 154. The sloped wall 227 also provides a portion (i.e., the circular boundary 197) dimensioned to engage the support wall 192 after the inner portion 159 is displaced. In the same or other embodiments, the sloped wall may include other surface features dimensioned for, without limitation, engaging the support wall 192 at multiple positions and/or accommodating structures (e.g., locking structures) on the support wall 192.

With continuing reference to FIG. 11, an accessory electrical interface 165 including a male connector 166 is positioned within the hollow interior 162 of the support tube 191. The male connector 166 is spaced apart from the open bottom end 210 of the connection end 163, by the length L. The power interface set 122 also extends axially, in part, along the length L, and the top surface 125 of the power interface set 122 is spaced apart from a position (of the power interface set 122) adjacent to the bottom end 153 of the annular support slot 152, by the length L. Thus, the top surface 125 of the power interface set 122 is positioned adjacent to the male connector 166 when the connection end 163 is fully inserted into the support base 100—i.e., when the open bottom end 210 of the support tube 191 is positioned at the bottom end 153 of the annular support slot 152.

In the exemplary embodiment, a female connector 124 of the power interface set 122 is formed on the top surface 125 of the power interface set 122. The male connector 166 of the accessory electrical interface 165 and the female connector of the power interface set 122 are complementarily dimensioned to mate and form an electrical connection between the power interface set 122 and the accessory electrical interface 165 when the connection end 163 is full inserted into the support base 100. In an aspect, the male connector 166 may be a pin contact and the female connector 124 may be a pin receptacle, as known in the configuration generally of, for example, RCA connectors, banana plugs, audio jacks, and the like.

The power interface set 122 and the accessory electrical interface 165 may additionally or alternatively include respective magnetic materials that form a magnetic joint to strengthen the connection between the power interface set 122 and the accessory electrical interface 165. The magnetic materials may, in various embodiments, establish the electrical connection or fix a separate electrical connection between the power interface set 122 and the accessory electrical interface 165. The power interface set 122, the accessory electrical interface 165, and/or the connection therebetween may additionally or alternatively include a DC electric circuit that may include wired connections.

The type of electrical connection between the power interface set 122 and the accessory electrical interface 165 is not limited by the disclosure. The electrical connection may be formed by any known technique or componentry for forming a reversible electrical connection consistent with this disclosure.

With reference now to FIG. 12, the detachable electrical accessory is a reading lamp 167 in an exemplary embodiment of the assembly 200. The reading lamp 167 includes a support tube 191 having, among other things, a tube wall 192 and a connection end 163 configured as described with respect to FIG. 11. The reading lamp 167 attaches to and forms an electrical connection with the support base 100 in the same manner as described with respect to FIG. 11. In the exemplary embodiment shown in FIG. 12, and for the detachable electrical accessories generally, the support tube 191 may be formed from stainless steel, aluminum, carbon fiber or other similar hard and/or rigid materials consistent with this disclosure.

In the exemplary reading lamp 167 shown in FIG. 12, the accessory electrical interface 165 may be connected to a control board 173 installed above the accessory electrical interface 165 within the support tube 191. The connection to the control board 173 may be, without limitation, via wires 174 held in place by a wire pressing block 176. In various aspects, the control board 173 for the exemplary reading lamp 167 may include a touch sensor unit (not shown) and processing components, drivers, and the like (collectively, "electrical control components"). The touch sensor unit may, for example, sense touch or other tactile or mechanical contact or vibration on the support wall 192, as a control input. The touch sensor and the electrical control components may cooperate to control various functions of the reading lamp 167. The functions may include, without limitation, turning the reading lamp 167 on and off and adjusting the brightness of the reading lamp 167. A pressure spring 177 may provide support generally for a head support assembly 179 securing the accessory electrical interface 165/male connector 166 in position within the hollow interior 162 of the support tube 191.

An exemplary embodiment of a method of assembling a detachable electrical accessory and a support base, such as the exemplary support base 100 and detachable electrical accessory described throughout this disclosure, includes inserting a connection end 163 of a support tube 191 of the detachable electrical accessory into an annular support slot 152 of the support base 100. The exemplary support base 100 and detachable electrical accessory (e.g., reading lamp 167) have previously been described and such description is not fully repeated here. Instead, reference is made generally to the above descriptions with respect to FIGS. 1-12, where like numerals represent like components and the above descriptions aid in understanding the exemplary method(s).

In the exemplary method, the connection end 163 is inserted into an annular support slot 152 formed in a chamber 105 of the support base 100. The chamber 105 is defined by a chamber wall 106 of a connector hub 101 of the support base 100. The annular support slot 152 is formed as a gap between a casing 129 within which a power interface set 122 is positioned in a central hollow interior 107 of the chamber 105 and a tubing collar 148 that abuts an inner surface of the chamber wall 106, within the chamber 105. In various aspects, a support wall 192 of the support tube 191, at the connection end 163, may have a thickness 'T' corresponding to a width of the annular support slot 152 and the method may include inserting the support wall 192 into the annular support slot 152. The support wall 192 may define a hollow interior 162 of the support tube 191 and the method may include receiving the casing 129 and the power interface set 122 within the hollow interior 162 as the connection end 163 is inserted into the chamber 105. An accessory electrical interface 165 may be housed within the hollow interior 162 at the connection end 163 and the method may include electrically connecting the accessory electrical interface set 165 and the power interface set 122 by, without limitation, connecting a male connector 166 of the accessory electrical interface 165 with a female connector 124 of the power interface set 122. The accessory electrical interface 165 may be positioned within the hollow interior 162 at a distance equal to a length 1' of the connection end 163 that is substantially equal to a distance to which a top surface 125 of the power interface set 122 extends axially above a position of the power interface set 122 adjacent to a bottom end 153 of the annular support slot 152, and the method may include inserting the connection end 163 into the chamber 105 until an open bottom end 210 of the connection end 163 is positioned at the bottom end 153 of the annular support slot 152 and the top surface 125 of the power interface set 122 is adjacent and electrically connected to the accessory electrical interface 165.

The method may further include displacing a baffle 154, i.e., an inner portion 159 of a baffle 154 that extends into the annular support slot 152 in an uncompressed state, by displacing the baffle 154 with the connection end 163 inserted into the annular support slot 152. In an aspect, the connection end 163 displaces the inner portion 159 of the baffle 154 by moving the baffle 154 to a compressed state, by compressing baffle springs 156 coupled to the baffle 154 and biasing the baffle 154 towards the central hollow interior 107. In an aspect, the method may include exerting with the baffle springs 156 an opposing force, such that the baffle 154 engages and stabilizes and/or secures the connection end 163 in the annular support slot 152.

The exemplary method may further include installing the support base 100 in a furniture item.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A support base, comprising:
   a connector hub having a top end, a bottom end spaced apart from the top end, and a chamber wall extending between the top end and the bottom end and defining a chamber;
   a flange radially extending from the top end of the connector hub; and
   an interface positioned in the chamber, wherein:
      a maximum outer width of the interface is less than an inner width of the chamber such that a support gap is defined between the interface and the chamber wall,
      the support gap is dimensioned for receiving a wall of a support structure having a hollow interior into which the interface is received, and
      the interface is a power interface set configured for electrically connecting to an electrical interface of an electrical accessory.

2. The support base of claim 1, further comprising:
   a cover plate coupled to the top end of the connector hub, wherein the cover plate comprises a cover plate hole axially aligned with the interface,
   wherein a top end of the interface is positioned adjacent to the cover plate hole.

3. The support base of claim 2, further comprising:
   a flange slot formed on an outer edge of the flange, wherein
   the cover plate comprises a fastening mechanism, and
   the fastening mechanism is mechanically secured within the flange slot such that the cover plate is coupled to the flange.

4. The support base of claim 1, further comprising:
   a baffle positioned in a flange groove formed in an upper surface of the flange; and
   a baffle spring positioned between the baffle and a flange groove wall of the flange, wherein the baffle spring is moveable between an uncompressed state and a compressed state.

5. The support base of claim 4, further comprising:
a casing comprising:
   a top end;
   a bottom end spaced apart from the top end; and
   a lumen extending from the top end to the bottom end of the casing, wherein the interface is positioned within the lumen of the casing.

6. The support base of claim 5, wherein the casing further comprises:
a casing groove formed inside the lumen adjacent the bottom end of the casing,
wherein an interface flange is positioned in the casing groove.

7. The support base of claim 5, further comprising:
a tubing collar positioned between the chamber wall and the casing, wherein
an outer diameter of the tubing collar is dimensioned such that the tubing collar fits within the chamber, and
an inner diameter of the tubing collar is greater than an outer diameter of the casing, such that a support slot is defined between the tubing collar and the casing.

8. The support base of claim 7, wherein at least a portion of the baffle overlaps at least a portion of the support slot.

9. The support base of claim 7, wherein the tubing collar comprises a light source extending around a top end of the tubing collar.

10. The support base of claim 7, further comprising:
a casing flange positioned adjacent the bottom end of the casing, wherein the casing flange comprises:
a casing flange slot extending into the casing flange from an upper surface of the casing flange; and
an opening in communication with the lumen of the casing,
wherein the tubing collar includes a fastening mechanism extending downward from a lower end of the tubing collar and the fastening mechanism is dimensionally configured to be received in the casing flange slot.

11. The support base of claim 10, wherein:
the fastening mechanism is positioned adjacent the lower end of the tubing collar and is mechanically coupled to the casing flange slot.

12. A support base, comprising:
a connector hub having a top end, a bottom end spaced apart from the top end, and a chamber wall extending between the top end and the bottom end and defining a chamber;
a flange radially extending from the top end of the connector hub and defining a flange groove;
a baffle positioned in the flange groove;
a baffle spring positioned between the baffle and a flange groove wall of the flange groove, wherein the baffle spring is moveable between an uncompressed state and a compressed state; and
a power interface set positioned in the chamber, wherein a maximum outer width of the power interface set is less than an inner width of the chamber wall such that a support gap is defined between the power interface set and the chamber wall,
wherein the support gap and the baffle are configured for removably receiving and securing a wall of a support structure having a hollow interior into which the power interface set is received.

13. The support base of claim 12, further comprising:
a magnetic joint configured to establish an electrical connection between the power interface set and an electrical interface of an electrical accessory.

14. The support base of claim 13, wherein the magnetic joint comprises magnetic materials in the power interface set.

15. The support base of claim 12, further comprising:
a casing positioned in the support gap; and
a tubing collar positioned between the casing and the chamber wall.

16. A support base, comprising:
a connector hub having a top end, a bottom end spaced apart from the top end, and a chamber wall extending between the top end and the bottom end and defining a chamber;
a flange radially extending from the top end of the connector hub and defining a flange groove;
a baffle positioned in the flange groove;
a baffle spring positioned between the baffle and a flange groove wall of the flange groove, wherein the baffle is movable by the baffle spring between a first position and a second position;
a power interface set positioned in the chamber; and
a casing positioned between the power interface set and the chamber wall, wherein the baffle in the first position at least partially overlaps a space adjacent to the casing.

17. The support base of claim 16, wherein the baffle in the second position and the space are together configured to receive and secure a wall of a support structure within the space.

18. The support base of claim 17, wherein receiving the wall of the support structure within the space is operative to move the baffle from the first position to the second position.

19. The support base of claim 16, wherein the power interface set includes magnetic materials that form a magnetic joint with an accessory electrical interface.

* * * * *